B. S. HARRINGTON.
Fire-Kindlers.

No. 147,556.  Patented Feb. 17, 1874.

Witnesses:
Frank H. Jordan
Edwin W. Haskell

Inventor:
B. S. Harrington,
per Atty.
Wm. Henry Clifford

UNITED STATES PATENT OFFICE.

BARZILLA S. HARRINGTON, OF CHINA, MAINE.

IMPROVEMENT IN FIRE-KINDLERS.

Specification forming part of Letters Patent No. 147,556, dated February 17, 1874; application filed December 27, 1873.

*To all whom it may concern:*

Be it known that I, BARZILLA S. HARRINGTON, of China, in the county of Kennebec and State of Maine, have invented certain new and useful Improvements in Fire-Kindling Devices; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1:
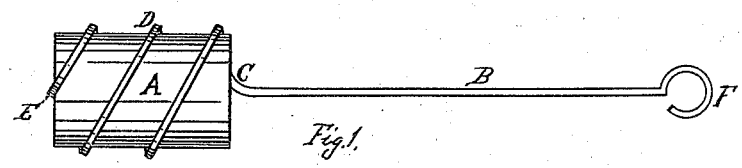
Figure 2:
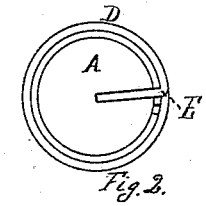
Figure 3:
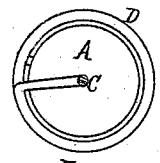

Figure 1 is a side elevation. Fig. 2 is one-end view. Fig. 3 is a view of the opposite end.

My invention relates to a device for the kindling of fires. The entire device consists of a ball or porous block so composed and constructed as to be capable of absorbing oils or any inflammable liquid which it may be desirable to use; a handle so arranged as to contain and hold the porous block, and also so as to be quickly and easily removed from the block or ball when it is desired to use a new one, saturate the ball, or for any other purpose. My invention consists in a handle or holder to be connected with and embrace the firing ball or block, and so arranged that, by a single turn of that part of the holder or handle which is grasped by the hand, the firing-ball can be removed or inserted.

A particular description will illustrate the invention.

A is the firing-ball. This I make of a composition of clay and asbestus, the latter being the principal ingredient, and having superior advantages for the purpose. B is the handle or holder. At the end of the firing-ball next to the hand, the handle is bent or formed so as to rest against the end extending in toward the center of the end of the ball, as shown at C. The holder then passes around the body of the ball, as seen at D, until, at the outer end of the ball, it is again bent or turned inwardly, as shown at E. Thus the porous ball is properly held. F shows a widened portion of the handle. This is to render the insertion or removal of the ball easier.

By grasping this wide part of the handle and twisting or turning the same, the part C can be turned off and away from the inner end of the ball, and then the ball can be readily slipped out. When returned into the handle, an opposite motion from the one above described will restore the part C to such position as to again hold the block as before.

Instead of the part C being made to turn in consequence of the flexibility of the handle, it may be furnished with a hinge or joint.

I do not claim a fire-kindling implement composed of a porous head and a handle; neither do I claim a fire-kindler consisting of a perforated metal case and a porous absorbent filling.

I claim only the handle to the fire-ball having the widened part, straight shank, the two end pieces, and the portion spirally encompassing the ball, as shown and set forth, and operating for the release of the ball, as herein described.

What I claim as my invention, and desire to secure by Letters Patent, is—

The handle composed of the widened part F, the straight shank, the bent portion C, the spiral portion encompassing the fire-ball, as shown at D, and the bent portion E, the said part C being made to turn in consequence of the flexibility of the handle, as herein set forth.

In testimony that I claim the foregoing I have hereunto set my hand this 16th day of December, 1873.

B. S. HARRINGTON.

Witnesses:
L. A. HARRINGTON,
M. B. HARRINGTON.